(12) United States Patent
Rizzo (10) Patent No.: US 10,997,483 B2
(45) Date of Patent: May 4, 2021

(54) NFC ANTENNA SWITCH (71) Applicant: STMicroelectronics, Inc., Coppell, TX (US)

(72) Inventor: Pierre Rizzo, Mountain View, CA (US)

(73) Assignee: STMICROELECTRONICS, INC, Coppell, TX (US)

( * ) Notice: Subject to any disclaimer, the term of this patent is extended or adjusted under 35 U.S.C. 154(b) by 0 days.

(21) Appl. No.: 16/438,954

(22) Filed: Jun. 12, 2019

(65) Prior Publication Data
US 2020/0394486 A1   Dec. 17, 2020

(51) Int. Cl.
| | |
|---|---|
| *G06K 19/07* | (2006.01) |
| *H01Q 1/24* | (2006.01) |
| *H04B 5/00* | (2006.01) |
| *H01Q 1/52* | (2006.01) |
| *H01Q 1/22* | (2006.01) |

(52) U.S. Cl.
CPC ......... *G06K 19/0724* (2013.01); *H01Q 1/246* (2013.01); *H01Q 1/521* (2013.01); *H04B 5/0056* (2013.01); *H01Q 1/2216* (2013.01); *H01Q 1/2225* (2013.01)

(58) Field of Classification Search
CPC .... G06K 19/0724; H01Q 1/246; H01Q 1/521; H01Q 1/2225; H01Q 1/2216; H04B 5/0056
See application file for complete search history.

(56) References Cited

U.S. PATENT DOCUMENTS

| | | | |
|---|---|---|---|
| 7,536,155 B2 | 5/2009 | Forster et al. | |
| 7,907,057 B2 | 3/2011 | Schaffler et al. | |
| 8,031,054 B2 * | 10/2011 | Tuttle ............... | G06K 19/07786 340/10.5 |
| 8,188,787 B2 | 5/2012 | Wilson et al. | |
| 8,457,550 B2 | 6/2013 | Goto et al. | |
| 8,466,791 B2 | 6/2013 | Goto et al. | |
| 8,565,675 B2 | 10/2013 | Bangs et al. | |
| 8,773,216 B2 * | 7/2014 | Dupont .................... | H01P 5/18 333/109 |
| 8,983,374 B2 | 3/2015 | Wiley | |
| 9,098,787 B2 | 8/2015 | Saarisalo et al. | |
| 9,246,351 B2 | 1/2016 | Ozaki et al. | |
| 9,305,193 B2 | 4/2016 | Lee et al. | |
| 9,402,278 B2 | 7/2016 | Adams et al. | |
| 9,420,409 B2 | 8/2016 | Kulkarni | |

(Continued)

*Primary Examiner* — Seung H Lee
(74) *Attorney, Agent, or Firm* — Slater Matsil, LLP (57) ABSTRACT

Circuits and methods of operating multiple antennas using a shared controller are provided. In one embodiment, a method includes coupling, in a first configuration, a first antenna to the shared controller and decoupling a second antenna from the shared controller. The first antenna is coupled to the shared controller using a first matching circuit and a first filter. The method further includes operating a controllable activation component to define a second configuration state formed by decoupling the first antenna from the shared controller and coupling the second antenna to the shared controller. In this embodiment, the second antenna is coupled to the shared controller using a second matching circuit and a second filter. At least one capacitor of the first matching circuit is used in the second filter and at least one capacitor of the second matching circuit is used in the first filter.

23 Claims, 7 Drawing Sheets

(56) References Cited

U.S. PATENT DOCUMENTS

| | | |
|---|---|---|
| 9,941,935 B2 | 4/2018 | Rizzo et al. |
| 10,050,474 B2 | 8/2018 | Ichikawa |
| 2007/0008132 A1 | 1/2007 | Bellantoni |
| 2010/0090805 A1 | 4/2010 | Libotte |
| 2010/0148723 A1 | 6/2010 | Cook et al. |
| 2010/0190436 A1 | 7/2010 | Cook et al. |
| 2016/0308587 A1* | 10/2016 | Lee ..................... H04B 5/0081 |
| 2018/0109294 A1 | 4/2018 | Rizzo et al. |
| 2018/0335880 A1* | 11/2018 | Seol ..................... G06F 3/0488 |

* cited by examiner

NFC ANTENNA SWITCH

TECHNICAL FIELD

The present disclosure relates generally to an antenna circuit, and, in particular embodiments, to a configurable antenna circuit allowing one controller to control two or more contactless antennas.

BACKGROUND

Modern electronic devices are frequently equipped with one or more antennas to provide wireless functionalities, such as wireless communication or wireless charging. Each antenna may allow for a different wireless operation using a different communication protocol or to provide multiple wireless access points. As an example, an electronic device may include multiple contactless antennas in a multitude of tap points (e.g., surface, back, top, bottom, etc.). In this device, the manufacturer may choose minimize the number of components, for example, to reduce device cost. An option is to have a single controller receive and/or transmit data from and/or to multiple contactless antennas.

SUMMARY

Technical advantages are generally achieved by embodiments of this disclosure, which describe an antenna circuit.

A first aspect relates to an antenna circuit, the antenna circuit includes a first switch configured as normally switched ON, the first switch configured to be switched OFF after receiving a first gate bias; a second switch configured as normally switched OFF, the second switch configured to be switched ON after receiving a second gate bias, the second switch switched ON in response to the first switch being switched OFF, a first contactless antenna coupled to the first switch, the first contactless antenna disabled in response to the first switch being switched ON, the first contactless antenna enabled in response to the first switch being switched OFF, a second contactless antenna coupled to the second switch, the second contactless antenna disabled in response to the second switch being switched ON, the second contactless antenna enabled in response to the second switch being switched OFF; and a controller coupled to the first contactless antenna and the second contactless antenna, the controller configured to control an operation of the first switch and the second switch by generating the first gate bias and the second gate bias.

In a first implementation form of the antenna circuit according to the first aspect, the first switch is a depletion-mode metal-oxide-semiconductor field effect transistor (MOSFET) and the second switch is an enhancement-mode MOSFET.

In a second implementation form of the antenna circuit according to the first aspect as such or any preceding implementation form of the first aspect, the first contactless antenna or the second contactless antenna operates using single-ended signaling, differential signaling, or a combination thereof.

In a third implementation form of the antenna circuit according to the first aspect as such or any preceding implementation form of the first aspect, the controller is a near field communication (NFC) controller capable of operating in card-emulation mode, reader/writer mode, peer-to-peer mode, or a combination thereof.

In a fourth implementation form of the antenna circuit according to the first aspect as such or any preceding implementation form of the first aspect, a resonant frequency of the first contactless antenna or the second contactless antenna is 13.56 megahertz (MHz), 27.12 MHz, 6.78 MHz, or a combination thereof.

In a fifth implementation form of the antenna circuit according to the first aspect as such or any preceding implementation form of the first aspect, the antenna circuit further includes an electromagnetic compatibility (EMC) filter coupled between the controller and the first contactless antenna, the EMC filter configured to filter out signals outside of a resonant frequency of the first contactless antenna; and a matching circuit coupled between the controller and the first contactless antenna, the matching circuit configured to match an impedance of the first contactless antenna to an impedance of the controller and the EMC filter.

In a sixth implementation form of the antenna circuit according to the first aspect as such or any preceding implementation form of the first aspect, the antenna circuit further includes an electromagnetic compatibility (EMC) filter coupled between the controller and the second contactless antenna, the EMC filter configured to filter out signals outside of a resonant frequency of the second contactless antenna; and a matching circuit coupled between the controller and the second contactless antenna configured to match an impedance of the second contactless antenna to an impedance of the controller and the EMC filter.

In a seventh implementation form of the antenna circuit according to the first aspect as such or any preceding implementation form of the first aspect, a resonant frequency of the first contactless antenna and a resonant frequency of the second contactless antenna is at a different frequency.

A second aspect relates to an electronic device that includes a controller configured to transmit signals, receive signals, and generate a first control signal and a second control signal; and a first contactless antenna coupled to the controller, the first contactless antenna normally disabled and coupled to a reference voltage, the first contactless antenna enabled in response to the controller generating the first control signal; a second contactless antenna normally enabled, the second contactless antenna disabled in response to the controller generating the second control signal, the second contactless antenna enabled in response to the first contactless antenna being disabled, the second contactless antenna disabled in response to the first contactless antenna being enabled, the first contactless antenna and the second contactless antenna having a different resonant frequency, the first contactless antenna and the second contactless antenna connected to a same input port and output port of the controller.

In a first implementation form of the electronic device according to the second aspect, the first contactless antenna or the second contactless antenna operates using single-ended signaling, differential signaling, or a combination thereof.

In a second implementation form of the electronic device according to the second aspect as such or any preceding implementation form of the second aspect, the controller is a near field communication (NFC) controller capable of operating in card-emulation mode, reader/writer mode, peer-to-peer mode, or a combination thereof.

In a third implementation form of the electronic device according to the second aspect as such or any preceding implementation form of the second aspect, a resonant frequency of the first contactless antenna or the second contactless antenna is 13.56 megahertz (MHz), 27.12 MHz, or 6.78 MHz.

In a fourth implementation form of the electronic device according to the second aspect as such or any preceding implementation form of the second aspect, an electromagnetic compatibility (EMC) filter coupled between the controller and the first contactless antenna, the EMC filter configured to filter out signals outside of a resonant frequency of the first contactless antenna; and a matching circuit coupled between the controller and the first contactless antenna, the matching circuit configured to match an impedance of the first contactless antenna to an impedance of the controller and the EMC filter.

In a fifth implementation form of the electronic device according to the second aspect as such or any preceding implementation form of the second aspect, the electronic device further includes an electromagnetic compatibility (EMC) filter coupled between the controller and the second contactless antenna, the EMC filter configured to filter out signals outside of a resonant frequency of the second contactless antenna; and a matching circuit coupled between the controller and the second contactless antenna, the matching circuit configured to match an impedance of the second contactless antenna to an impedance of the controller and the EMC filter.

A third aspect relates to an antenna circuit that includes a first contactless antenna (ANT1) and a second contactless antenna (ANT2); a first matching circuit includes a first switch (SW1), a first capacitor (C1), a second capacitor (C2), and a third capacitor (C3), a first terminal of C1 coupled to a first terminal of ANT1 and to a first terminal of C2, a second terminal of C1 coupled to a second terminal of ANT1, a second terminal of C2 coupled to a first terminal of C3 and to an input terminal of SW1, and an output terminal of SW1 coupled to a reference ground (Vref); a second matching circuit includes a second switch (SW2), a fourth capacitor (C4), a fifth capacitor (C5), and a sixth capacitor (C6), a first terminal of C4 coupled to a first terminal of ANT2 and to a first terminal of C5, a second terminal of C4 coupled to a second terminal of ANT2, a second terminal of C5 coupled to a first terminal of C6 and to an input terminal of SW2, and an output terminal of SW2 coupled to Vref; and a controller includes an input terminal, an output terminal, and one or more control terminals, each of the input terminal and the output terminal of the controller coupled to a second terminal of C3 and to a second terminal of C6, the one or more control terminals of the controller coupled to a control terminal of SW1 and SW2.

In a first implementation form of the antenna circuit according to the third aspect, a second terminal of ANT1 and a second terminal of ANT2 are coupled to Vref.

In a second implementation form of the antenna circuit according to the third aspect as such or any preceding implementation form of the third aspect, the controller further includes a second input terminal and a second output terminal. The first matching circuit further includes a third switch (SW3), a seventh capacitor (C7), an eight capacitor (C8), a first terminal of C7 coupled to the second terminal of ANT1, a second terminal of C7 coupled to a first input of SW3 and to a first terminal of C8, a second terminal of C8 coupled to the second input terminal and to the second output terminal of the controller, an output of SW3 coupled to Vref, and the one or more control terminals of the controller coupled to a control terminal of SW3.

In a third implementation form of the antenna circuit according to the third aspect as such or any preceding implementation form of the third aspect, the second matching circuit further includes a fourth switch (SW4), a ninth capacitor (C9), and a tenth capacitor (Cm), a first terminal of C9 coupled to the second terminal of ANT2, a second terminal of C9 coupled to a first input of SW4 and to a first terminal of C10, a second terminal of C10 coupled to the second input terminal and to the second output terminal of the controller, and an output of SW4 coupled to Vref, and the one or more control terminals of the controller coupled to a control terminal of SW4.

In a fourth implementation form of the antenna circuit according to the third aspect as such or any preceding implementation form of the third aspect, ANT1 operates at a different resonant frequency than ANT2.

A fourth aspect relates to a method of operating a first contactless antenna and a second contactless antenna in an antenna circuit using a shared controller, the method includes coupling the first contactless antenna to the shared controller and decoupling the second contactless antenna from the shared controller in a first configuration state of the antenna circuit, the first contactless antenna coupled to the shared controller using a first matching circuit and a first filter; and operating a controllable activation component to define a second configuration state of the antenna circuit formed by decoupling the first contactless antenna from the shared controller, coupling the second contactless antenna to the shared controller, the second contactless antenna coupled to the shared controller using a second matching circuit and a second filter, at least one capacitor of the first matching circuit is used in the second filter, at least one capacitor of the second matching circuit is used in the first filter.

In a first implementation form of the method according to the fourth aspect, the first contactless antenna and the second contactless antenna operate at a different resonant frequency.

In a second implementation form of the method according to the fourth aspect as such or any preceding implementation form of the fourth aspect, at least one of the first contactless antenna or the second contactless antenna is coupled to the shared controller.

In a third implementation form of the method according to the fourth aspect as such or any preceding implementation form of the fourth aspect, each of the first contactless antenna and second contactless antenna is configured for single-ended signaling or differential signaling.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

This disclosure provides many applicable inventive concepts that can be embodied in a wide variety of specific contexts. The specific embodiments are merely illustrative of specific configurations and do not limit the scope of the claimed embodiments. Features from different embodiments may be combined to form further embodiments unless noted otherwise. Variations or modifications described with respect to one of the embodiments may also be applicable to other embodiments. Further, it should be understood that various changes, substitutions, and alterations can be made herein without departing from the spirit and scope of this disclosure as defined by the appended claims.

The description below illustrates the various specific details to provide an in-depth understanding of several example embodiments according to the description. The embodiments may be obtained without one or more of the specific details, or with other methods, components, materials and the like. In other cases, known structures, materials, or operations are not shown or described in detail so as not to obscure the different aspects of the embodiments. References to "an embodiment" in this description indicate that a particular configuration, structure, or feature described in relation to the embodiment is included in at least one embodiment. Consequently, phrases such as "in one embodiment" that may appear at different points of the present description do not necessarily refer exactly to the same embodiment. Furthermore, specific formations, structures, or features may be combined in any appropriate manner in one or more embodiments.

A near field communication (NFC) enabled device can operate in card-emulation mode, reader/writer mode, and peer-to-peer mode. In the card-emulation mode, the NFC enabled device can perform payment transactions or ticketing similar to a smart card. In reader/writer mode, the NFC enabled device can read information stored on an NFC tag, or alternatively write to the NFC tag. In peer-to-peer mode, two NFC enabled devices can communicate and exchange information with each other.

A host device may include multiple NFC antennas in a variety of locations (e.g., surface, back, top, bottom, etc.) to allow NFC operations at a multitude of tap points. The host device may include a single controller to provide the various NFC functionalities. A single controller may, for example, advantageously reduce total part count and increase product profit margins.

In accordance to one embodiment and its implementation, the same system can combine, in a simple and compact manner, a single controller connected to a configurable circuit to transmit and receive signals over multiple contactless antennas.

According to one or more embodiments, the configurable circuit may have a default configuration mode. In the default configuration mode, at least one contactless antenna is connected to the controller. Additionally, the configurable circuit may be configured such that if the host device is turned OFF, at least one contactless antenna is connected to the controller. As a result, advantageously the host device may not need to be always turned ON to provide wireless functionalities.

Aspects of this disclosure provide operation of multiple contactless antennas using a single controller. In some embodiments, the multiple contactless antennas may operate using one of single-ended signaling, differential signaling, or a combination thereof. In some embodiments, each contactless antenna may operate at a different resonant frequency. In some embodiments, each contactless antenna may have a different impedance but operate at a same resonant frequency. Embodiments of this disclosure provide an antenna circuit that provides a respective matching circuit and electromagnetic compatible (EMC) filter for each of the contactless antennas, irrespective of the different contactless antennas operating at a same or a different frequency.

Aspects of this disclosure provide an antenna circuit for controlling multiple contactless antennas using a single controller, while ensuring system reliability, system flexibility, and minimization of signal compression. The selection of the components, and the arrangement of these components, provides a reliable and solid connection between each contactless antenna and the controller in each of the configuration modes. Additionally, the switching mechanisms in these embodiments allow for increased amounts of power while minimizing losses. These and other aspects are discussed in greater detail below.

Figure 1:
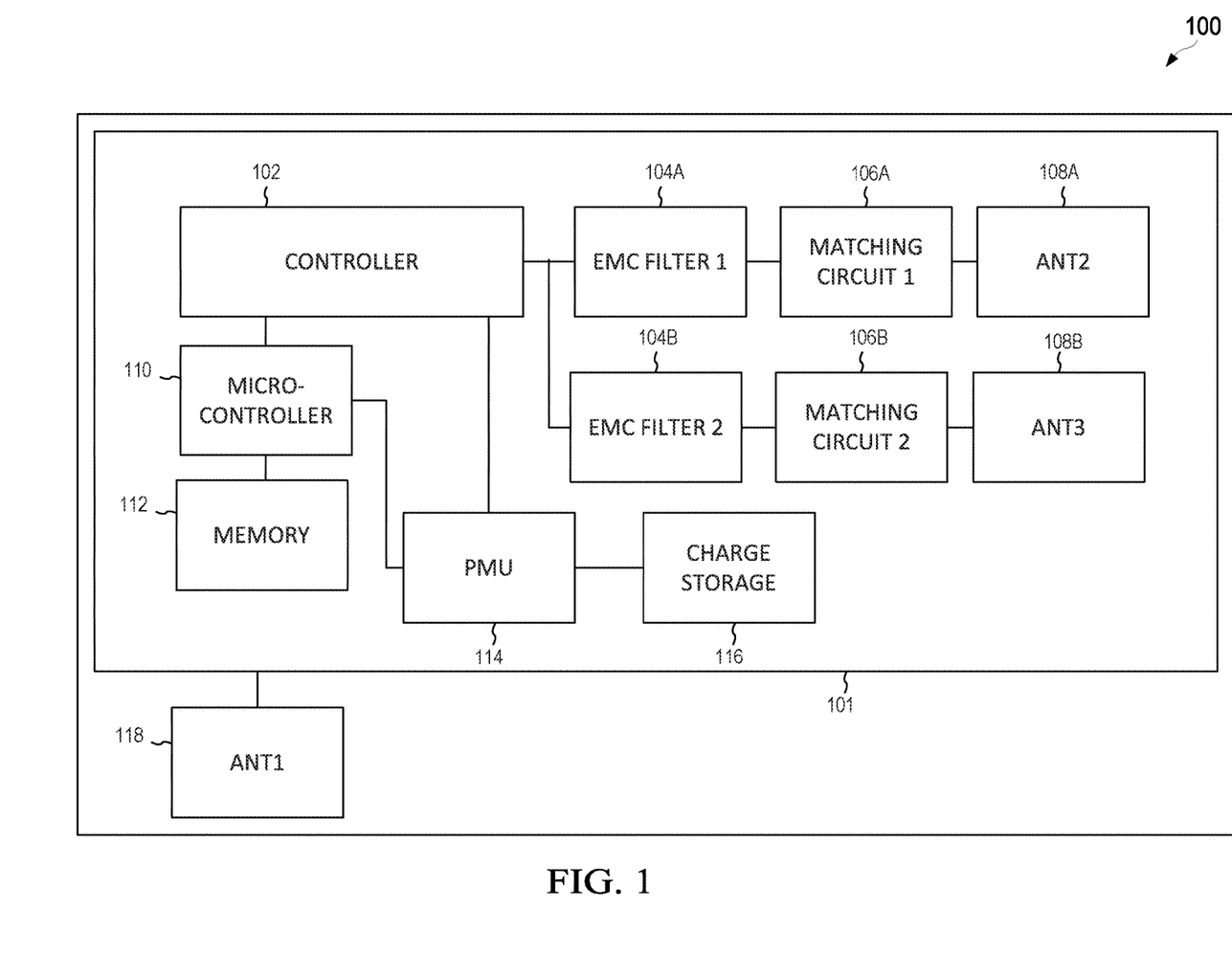
FIG. 1 illustrates a block diagram of an embodiment host device having a contactless communication block.

FIG. 1 illustrates a block diagram of an embodiment host device 100 having a contactless communication block 101. The host device 100 may be a cellular phone, a personal computer (PC), a tablet, a wearable communications device (e.g., smartwatch, etc.) a wireless capable vehicle, a wireless capable pedestrian, or any other device capable of contactless communication. The host device 100 may optionally have a first antenna 118 that is used for telephone communication.

The contactless communication block 101 provides contactless communication functionality with an external device or a contactless charging of a charge storage unit 116, such as a battery. As shown, the contactless communication block 101 includes a controller 102, two electromagnetic compatibility (EMC) filter circuits 104A-B, two matching circuits 106A-B, two contactless antennas 108A-B, and optionally, a microcontroller 110, a memory 112, a power management unit 114, and the charge storage unit 116, which may (or may not) be arranged as shown in FIG. 1. Each component in the contactless communication block 101 may be a discrete component or arranged with one or more components in a single integrated circuit (IC). The optional components may be discrete components or a series of integrated circuits that interface with the contactless communication block 101.

The contactless communication block 101 of FIG. 1 is shown to have two contactless antennas 108A-B and each contactless antenna 108A-B is connected to a discrete matching circuit and filter, it is noted that the matching circuit and filter may be arranged differently or shared between the antennas. It is also noted that only two contactless antennas are shown to simplify the discussion and greater number of contactless antennas may be contemplated, for example, as an array of contactless antennas fed by a single signal.

The controller 102 may be a near field communication (NFC) controller supporting contactless communication and NFC functions for card emulation, reader/writer, and peer-to-peer communications. The controller 102 may be capable of single sided and/or differential driving.

In some embodiments, the controller 102 may provide two different signals having a same carrier frequency to each of the contactless antennas 108A and 108B. In other embodiments, the controller 102 may provide two different signals having different carrier frequencies to each of the contactless antennas 108A and 108B.

The controller 102 may be a single integrated circuit (IC) or a series of discrete components. The controller 102 may have one or more input and output interface terminals in contact with the other components of the host device wo. The controller 102 may support a variety of standard or proprietary standards, such as the single wire protocol (SWP) interface, the serial peripheral interface (SPI), and the inter-integrated circuit ($I^2C$) interface. The controller 102 may be used to manage one or more communication protocols with the host device wo, manage gates related to the different protocols, used for power management, used for frame coding and decoding, and to operate various operating modes of the contactless communication block 101.

The controller 102 may include a control logic, a memory, a discrete or integrated radio frequency (RF) analog front end (AFE), a clock generator, a power management circuit, a capacitive sensor, and one or more oscillators (not shown). The control logic may define the operation of the controller 102, the contactless communication block 101, and the host device 100. The memory may store an operating system and instructions for receiving and transmitting signals and commands for the controller 102. The RF AFE may include a transmitter module and a receiver module to support a variety of contactless proximity (e.g., ISO/IEC 14443, ECMA 340 (NFCIP-1)) and vicinity (e.g., ISO/IEC 15693, ISO/IEC 18000-3 Mod1) standards. The transmitter module may be used to drive each of the contactless antennas 108A-B. The transmitter module may include a modulator, an amplifier, a detector, and a digital to analog converter (DAC).

The receiver module may be used to detect a modulated signal on a carrier signal. The receiver module may include one or more of an analog to digital converter (ADC), demodulator, a low noise amplifier, filter, and a digitizer. The clock generator may generate a clock signal to synchronize operations within the components of the controller 102 and the contactless communication block 101. The power management circuit may be used to support a variety of power supply sources, to power manage the various components of the controller 102, and to assure a stable and regulated supply to the controller 102. The capacitive sensor may be used to detect the presence of a transponder. The external field detector may be used to detect the presence of an external RF field. The controller may include one or more oscillators to generate signals at different frequencies. As an example, one oscillator may be capable of operating at 13.56 MHz and a second oscillator may be capable of operating at 27.12 MHz.

The EMC filter circuits 104A-B may be used to filter out harmonics or other unwanted signals from being received at the controller 102 or transmitted by the controller 102. Each of the EMC filter circuits 104A-B may be a low pass filter (LPF), a bandpass filter (BPF), a band-stop filter, such as a notch filter, or the like.

The matching circuits 106A-B may be used to match the impedance of the controller 102 and the respective EMC filter circuit 104A or 104B to the impedance of the respective contactless antenna 108A or 108B. The matching of the impedance reduces signal reflection and maximizes signal transfer, resulting in improved system efficiency. The impedance of the matching circuits 106A-B may be tuned based on a resonance between the transmitting and receiving components. However, even if the resonances are not matched, the coupling energy may still provide a signal to the host device 100.

The matching circuits 106A-B may be a fixed matching circuit or a tunable matching circuit. A tunable matching circuit, that includes switchable components (e.g., capacitors, inductors), may be used to vary the impedance of the matching circuits 106A-B based on measurable variables, such as power or current draw by one or more of the components of the contactless communications block 101.

Each of the contactless antennas 108A-B may be a loop antenna or a magnetic antenna. The loop antenna may include a physical core (e.g., ferrite core) or an air core. The contactless antennas 108A-B may be implemented as an antenna strip or using a Litz wire. The contactless antennas 108-B may have a resonant frequency in accordance with the shape and size of the looping wire or coil of the respective contactless antennas 108A-B and having an equivalent inductance and capacitance. As an example, each contactless antennas 108A-B may have an effective inductance and capacitance from the looping of the coils. In some embodiments, additional capacitance and inductance may be added to each of the contactless antennas 108A-B to create a resonant structure at a desired resonant frequency. For instance, the additional capacitance and inductance may be provided using discrete components. As another example, the winding or loop turns of the antenna may be "tuned" to adjust the capacitance and inductance of the antenna. In some embodiments, each contactless antenna 108A-B may be an array of antenna elements used to transmit and/or receive signals from an external device.

In some embodiments, each contactless antenna 108A and 108B may have a same structure and a same resonant frequency. In some other embodiments, each contactless antenna 108A and 108B may have a same resonant frequency but with a different impedance. In other embodiments, each contactless antenna 108A and 108B may have a different structure and a different resonant frequency. In any of these embodiments, the matching circuit and EMC filter may be different and arranged based on the resonant frequency and impedance of the respective contactless antenna.

The microcontroller no may generate and receive one or more of the signals to be communicated with the controller 102 and the power management unit 114. In some embodiments, the controller 102 may share functions with the microcontroller no or may be used as the primary controller of the contactless communications block 101. In such an embodiment, the controller 102 and the microcontroller no may be a single component. The microcontroller 110 may be a microprocessor, a digital signal processor, a field programmable gate array (FPGA), an application specific integrated circuit (ASIC), or the like, that may be formed on the same or a different substrate than the controller 102.

The controller 102 and the microcontroller no, individually or in combination, may be used to configure the various switches and configurations of the contactless communications block 101. For instance, the controller and/or the microcontroller no may generate control signals (e.g., bias voltages) to enable or disable various switches in the contactless communications block 101. The various configurations may enable or disable each of the contactless antennas 108A-B, such that a signal is received or transmitted using one of the contactless antennas 108A-B.

The memory 112 may include any type of non-transitory system memory such as static random access memory (SRAM), dynamic random access memory (DRAM), synchronous DRAM (SDRAM), read-only memory (ROM), or a combination thereof.

The power management unit 114 may include a power conversion circuit to convert the received RF energy to a charge stored at the charge storage unit 116. The power management unit 114 may include an RF-to-DC converter. The RF-to-DC converter may be used to rectify the RF energy to a non-alternating power (e.g., direct current (DC)). In some embodiments, the power management unit 114 may also include a DC-to-DC converter. The DC-to-DC convert may be used to convert the rectified energy from the RF-to-DC converter to a potential energy that is stored as a voltage in the charge storage unit 116. The charge storage unit 116 may be a battery or a capacitor that stores the potential energy, which is the converted to a potential energy by the power management unit 114.

Figure 2:
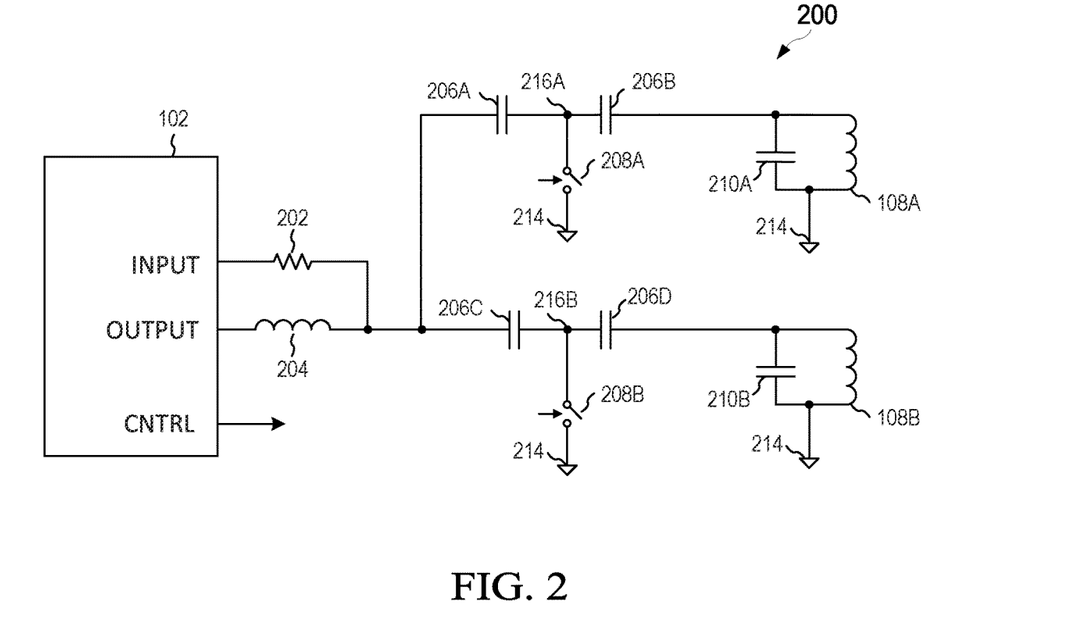
FIG. 2 illustrates a schematic of an embodiment antenna circuit operating using single-ended signaling.

FIG. 2 illustrates a schematic of an embodiment antenna circuit 200 operating using single-ended signaling. The signal traveling through the antenna circuit 200 is referenced to a fixed reference potential (e.g., ground or a 0 volt (V) node), shown as reference voltage 214. The antenna circuit 200, as shown, includes the controller 102, EMC filter circuits 104A-B, matching circuits 106A-B, and the contactless antennas 108A-B of FIG. 1. The antenna circuit 200 may be arranged as a single integrated circuit or discrete components within the contactless communication block 101 of FIG. 1.

The antenna circuit 200 includes the controller 102, a resistor 202, an inductor 204, capacitors 206A-D and 210A-B, switches 208A-B, and contactless antennas 108A-B. The number of contactless antennas in the antenna circuit 200 is non-limiting and minimized to simplify the discussion. Additional contactless antennas may be contemplated. Each contactless antenna may be a single antenna element or an array of antenna elements. Furthermore, if additional contactless antennas are used, additional matching circuits, EMC filters, and respective switching circuits may be contemplated.

The controller 102 includes an input terminal, an output terminal, and a control terminal. The input terminal is the receiving port of the controller 102 and the output terminal is the transmitting port of the controller 102. The input port of the controller 102 is connected to the resistor 202 and the output port is connected to the inductor 204. The resistor 202 shares a common node with the inductor 204. The resistor may be used to improve signal integrity by providing a proper input signal dynamic.

In some embodiments, the control terminal of the controller 102 may be coupled to various switches of the antenna circuit 200 to provide a control signal to one or more switches 208A-B. In some embodiments, the controller 102 may have more than one control terminal and a separate signal may be provided from each control terminal to each switch 208A-B. In some embodiments, a control signal may be provided to each switch 208A-B from another source, such as the microcontroller 110.

The inductor 204 in combination with the capacitor 206C may be used as an EMC filter circuit for the contactless antenna 108A. The inductor 204 in combination with the capacitor 206A may be used as an EMC filter circuit for the contactless antenna 108B. Each EMC filter circuit may have the functionalities as described regarding the EMC filter circuits 104A-B of FIG. 1.

The values of the inductor 204 and the capacitors 206A-B may be selectively chosen to allow the operation of the contactless antennas 108A-B at same or different frequencies. It should be appreciated that although the antenna circuit 200 is shown to include the inductor 204 and capacitors 206A-B, other components may be included, and in a variety of arrangements, to provide an effective EMC filter circuit for each of the contactless antennas 108A-B.

The capacitors 206A-B in combination with the capacitor 210A may be a matching circuit for the contactless antenna 108A. The capacitors 206C-D in combination with the capacitor 210B may be a matching circuit for the contactless antenna 108B. The matching circuit may have the functionalities as described with respect to the matching circuit 106A-B of FIG. 1.

The values of the capacitors 206A-D and 210A-B may be selectively chosen to provide a matching impedance between the contactless antennas 108A-B and the controller 102 (and any other circuit in-between the controller 102 and the matching circuit). It should be appreciated that although the antenna circuit 200 is shown to include the capacitors 206A-D and 210A-B, other components may be included and in a variety of arrangements to provide an effective matching impedance circuit for each of the contactless antennas 108A-B. As an example, a tunable matching circuit for each, or one of the two, contactless antennas 108A-B may be contemplated.

Advantageously, each contactless antenna 108A-B may have a different resonant frequency, operating at a different frequency. In some embodiments, each contactless antenna 108A-B may have a same resonant frequency but have a different impedance. Each respective matching circuit may be arranged to provide a matching circuit corresponding to the impedance of the contactless antenna 108A-B.

The contactless antenna 108A is arranged in parallel configuration with the capacitor 210A. The contactless antenna 108A and the capacitor 210A share a terminal connected to the reference voltage 214. The contactless antenna 108B is arranged in parallel configuration with the capacitor 210B. The contactless antenna 108B and the capacitor 210B share a terminal connected to the reference voltage 214.

The antenna circuit 200 is advantageously equipped with switches 208A-B, respectively located between the contact terminals 216A-B and the reference voltage 214. The switches 208A-B when switched ON (i.e., conducting) short circuit a corresponding contact terminal 216A-B to the reference voltage 214.

The switch 208A may be selected such that when 1) the switch 208B is switched ON and conducting, the switch 208A is OFF and not conducting and 2) the switch 208B is switched OFF and not conducting, the switch 208A is ON and conducting. In an exemplary embodiment, the switch 208A may be of the depletion-mode FET type and the switch 208B may be of the enhancement-mode FET type. In another exemplary embodiment, the switch 208B may be of the depletion-mode FET type and the switch 208A may be of the enhancement-mode FET type. In these exemplary embodiments, at least one of the contactless antennas 108A-B may be enabled without the application of a bias voltage to any of the switches 208A-B.

In some embodiments, the switches 208A-B may be field effect transistors (FETs). The switches 208A-B may be negative-type metal oxide semiconductor field effect transistors (n-MOSFETs), positive-type MOSFETs (p-MOSFETS), or junction FETs (JFETs), the like, or a combination thereof.

The switches may be controlled using a control signal or a gate bias voltage originating from the controller 102, microcontroller 110, or any other component of the host device 100.

Figure 3A:
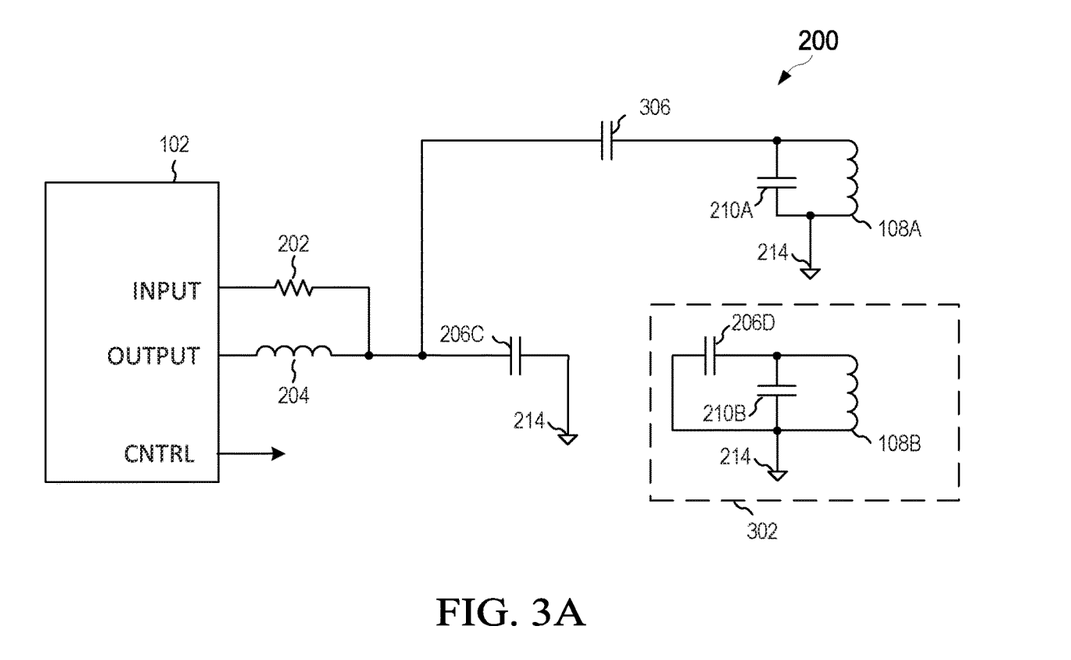
FIG. 3A illustrates a schematic of an equivalent circuit to the antenna circuit of FIG. 2 in a first configuration.

FIG. 3A illustrates an equivalent circuit to the antenna circuit 200 when the switch 208A is switched OFF and the switch 208B is switched ON and conducting. In a first configuration, or state, of the antenna circuit 200, the contact terminal 216B is short-circuited to the reference voltage 214 and the contact terminal 216A is not shorted to the reference voltage 214. In this configuration, the contactless antenna 108A is operational and the contactless antenna 108B is disabled. The circuit 302 that includes the contactless antenna 108B, the capacitors 210B, and 206D is effectively no longer connected to the controller 102. In other words, the contactless antenna 108B is deactivated by having both terminals coupled to reference ground.

The inductor 204 and the capacitor 206C provide an EMC filter for the contactless antenna 108A. The equivalent capacitor 306 is a capacitor having an equivalent capacitance to the capacitance of the capacitors 206A and 206B arranged in series. More precisely, the capacitors 206A and 206B form an equivalent capacitor 306, $$C_{306} = \frac{C_{206A} \times C_{206B}}{C_{206A} + C_{206B}}.$$

The equivalent capacitor 306 and the capacitor 210A provide a matching circuit for the contactless antenna 108A.

Figure 3B:
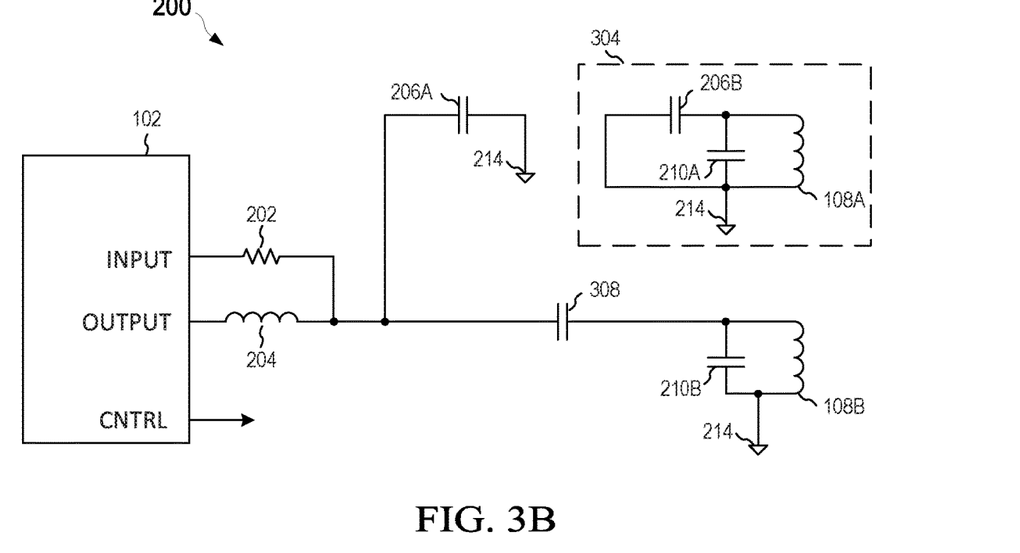
FIG. 3B illustrates a schematic of an equivalent circuit to the antenna circuit of FIG. 2 in a second configuration.

FIG. 3B illustrates an equivalent circuit to the antenna circuit 200 when the switch 208B is switched OFF and the switch 208A is switched ON and conducting. In a second configuration, or state, of the antenna circuit 200, the contact terminal 216A is short-circuited to the reference voltage 214 and the contact terminal 216B is NOT shorted to the reference voltage 214. In this configuration, the contactless antenna 108B is operational and the contactless antenna 108A is disabled. The circuit 304 that includes the contactless antenna 108A, the capacitors 210A, and 206B are effectively no longer connected to the controller 102. In other words, the contactless antenna 108A is deactivated by having both terminals coupled to reference ground.

The inductor 204 and the capacitor 206A provide an EMC filter for the contactless antenna 108B. The equivalent capacitor 308 is a capacitor having an equivalent capacitance to the capacitance of the capacitors 206C and 206D arranged in series. More precisely, the capacitors 206C and 206D form an equivalent capacitor 308, $$C_{308} = \frac{C_{206C} \times C_{206D}}{C_{206C} + C_{206D}}.$$

The equivalent capacitor 308 and the capacitor 210B provide a matching circuit for the contactless antenna 108B.

The two different configurations, shown in FIGS. 3A-B, advantageously allow the operation of two different contactless antennas 108A-B having different resonant frequencies or two different contactless antennas 108-B having different characteristic impedances. The value of the capacitor 206C may be selected to provide an EMC filter for the contactless antenna 108A. The value of the capacitors 206B and 210A may be selected to provide a matching circuit for the operation of the contactless antenna 108A. As an example, the values of the capacitors 206B-C and 210A may be selected to provide a circuit operating at a resonance frequency equal to 6.78 MHz, which is compatible with contactless charging conforming to the alliance for wireless power (A4WP) specifications. In this example, the contactless antenna 108A may be configured to operate at around 6.78 MHz.

The value of the capacitor 206A may be selected to provide an EMC filter for the contactless antenna 108B. The value of the capacitors 206D and 210B may be selected provide a matching circuit for the operation of the contactless antenna 108B. As an example, the values of the capacitors 206A, 206D, and 210B may be selected to provide a circuit operating at a resonance frequency equal to 13.56 MHz, which is compatible with contactless charging conforming to the near field communication (NFC) specifications. In this example, the contactless antenna 108B may be configured to operate at around 13.56 MHz.

Figure 4:
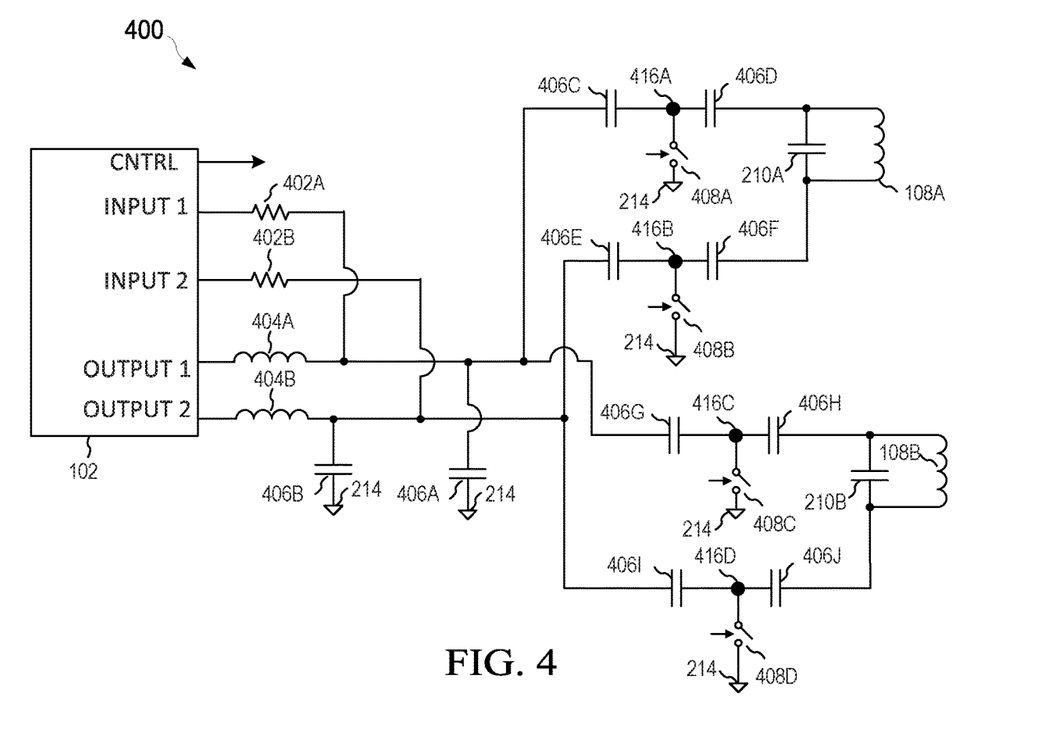
FIG. 4 illustrates a schematic of an embodiment antenna circuit operating using differential signaling.

FIG. 4 illustrates a schematic of an embodiment antenna circuit 400 operating using differential signaling. The antenna circuit 400, as shown, includes the controller 102, EMC filter circuits 104A-B, matching circuits 106A-B, and the contactless antennas 108A-B of FIG. 1. The antenna circuit 400 may be arranged as a single integrated circuit or discrete components within the contactless communication block 101 of FIG. 1.

The controller 102 provides complementary signals (i.e., differential pair of signals) to the contactless antennas 108A-B. Each of the pair of differential signals is generated at the output terminals or received at the input terminals of the controller 102. The input terminals are the receiving ports of the controller 102 and the output terminals are the transmitting ports of the controller 102. Each input port of the controller 102 is connected to a resistor 402A or 402B. Each output port of the controller is connected to an inductor 404A or 404B. The resistor 402A is connected to a node of the inductor 404A. The resistor 402B is connected to a node of the inductor 404B.

The antenna circuit 400 includes the controller 102, resistors 402A-B, inductors 404A-B, capacitors 406A-J and 210A-B, switches 408A-D, and contactless antennas 108A-B. The number of contactless antennas in the antenna circuit 400 is non-limiting and minimized to simplify the discussion. Additional contactless antennas may be contemplated. Each contactless antenna may be a single antenna element or an array of antenna elements.

The inductor 404A in combination with the capacitor 406G and the inductor 404B in combination with the capacitor 406I may be used as an EMC filter circuit for the contactless antenna 108A. The inductor 404A in combination with the capacitor 406C and the inductor 404B in combination with the capacitor 406E may be used as an EMC filter circuit for the contactless antenna 108B. Each of these EMC filter circuits may have the functionalities as described regarding the EMC filter circuits 104A-B of FIG. 1.

The values of the inductors 404A-B and the capacitors 406C, 406E, 406G, and 406I may be selectively chosen to allow the operation of the contactless antennas 108A-B at the same or different impedances. It should be appreciated that although the antenna circuit 400 is shown to include the inductors 404A-B and capacitors 406C, 406E, 406G, and 406I, other components with a variety of arrangements may provide an effective EMC filter circuit for each of the contactless antennas 108A-B.

The capacitors 406C, 406D, 406E, 406F in combination with the capacitor 210A may be a matching circuit for the contactless antenna 108A. The capacitors 406G, 406H, 406I, 406J in combination with the capacitor 210B may be a matching circuit for the contactless antenna 108B. Each matching circuit may have the functionalities as described regarding the matching circuit 106A-B of FIG. 1.

The values of the capacitors 406C, 406D, 406E, 406F, 406G, 406H, 406I, 406J and 210A-B may be selectively chosen to provide a matching impedance between the contactless antennas 108A-B and the controller 102 (and any other circuit in-between the controller 102 and the matching circuit). It should be appreciated that although the antenna circuit 400 is shown to include the capacitors 406C, 406D, 406E, 406F, 406G, 406H, 406I, 406J and 210A-B, other components may be included, and in a variety of arrangements, to provide an effective matching impedance circuit for each of the contactless antennas 108A-B. As an example, a tunable matching circuit for each of the contactless antennas 108A-B may be contemplated.

Advantageously, each contactless antenna 108A-B may have a different resonant frequency and operating at a different frequency. Another advantage may be that each contactless antenna 108A-B may have a same resonant frequency but a different impedance. Each respective matching circuit may be arranged to provide a matching circuit corresponding to the impedance of the contactless antenna 108A-B.

The contactless antenna 108A is arranged in parallel configuration with the capacitor 210A. Each shared node (shared between the contactless antenna 108A and the capacitor 210A) has a voltage corresponding to a different one of the differential pair of signals of the antenna circuit 400. The contactless antenna 108B is arranged in parallel configuration with the capacitor 210B. Each shared node (shared between the contactless antenna 108B and the capacitor 210B) has a voltage corresponding to a different one of the differential pair of signals of the antenna circuit 400.

The antenna circuit 400 is advantageously equipped with switches 408A-D, respectively located between the contact terminals 416A-D and the reference voltage 214. The switches 408A-D when switched ON (i.e., conducting), short circuit a corresponding contact terminal 416A-D to the reference voltage 214. The switches 408A-B may be configured and selected as a first combination of switches. Similarly, the switches 408C-D may be configured and selected as a second combination of switches.

The first combination of switches (i.e., switches 408-B) may be selected such that when 1) the second combination of switches (i.e., switches 408C-D) are switched ON and conducting, the first combination of switches are OFF and not conducting and 2) the second combination of switches are switched OFF and not conducting, the first combination of switches are ON and conducting. In an exemplary embodiment, the first combination of switches may be of the depletion-mode type and the second combination of switches may be of the enhancement-mode type. In this exemplary embodiment, at least one of the contactless antennas 108A-B may be enabled without the application of a bias voltage to any of the switches in the first combination and second combination of switches.

In some embodiments, one or more of the switches 408A-D may be a FET type of switch. In an exemplary embodiment, one or more of the switches 408A-D may be a n-MOSFET, p-MOSFET, JFET, the like, or a combination thereof. Each switch 408A-D may be controlled using a control signal or a gate bias voltage originating from the controller 102, the microcontroller 110, or any other component of the host device 100.

Figure 5A:
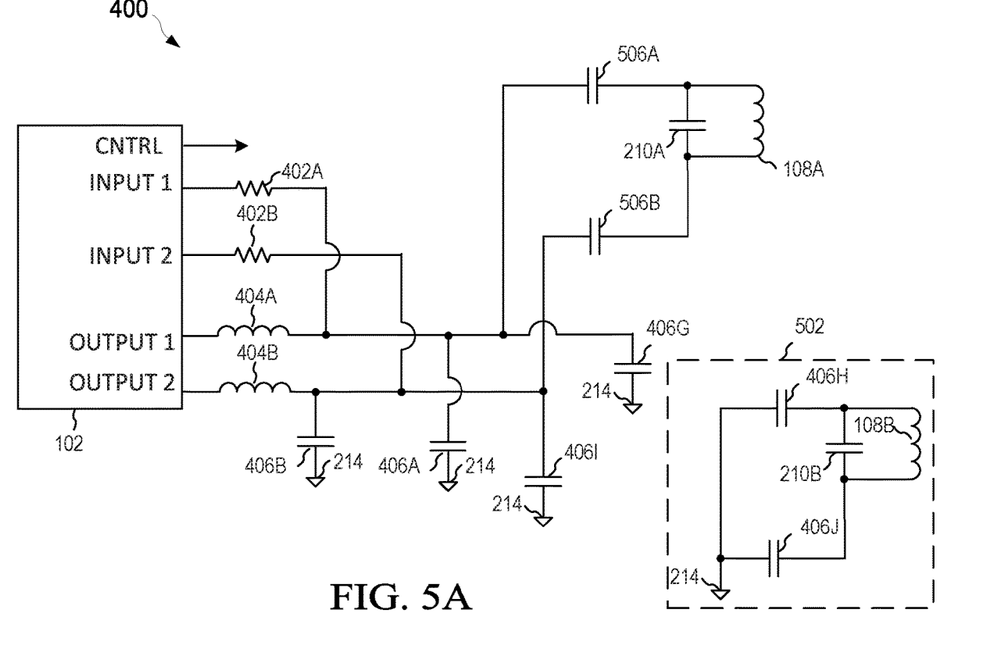
FIG. 5A illustrates a schematic of an equivalent circuit to the antenna circuit of FIG. 4 in a first configuration.

FIG. 5A illustrates an equivalent circuit to the antenna circuit 400 when switches 408A-B are switched OFF and switches 208C-D are switched ON and conducting. In a first configuration, or state, of the antenna circuit 400, the switches 408C-D are short-circuited to the reference voltage 214 and the contact terminals 416C-D are shorted to the reference voltage. The switches 408A-B remain open and the contact terminals 416A-B are not shorted to the reference voltage. In this configuration, the contactless antenna 108A is operational and the contactless antenna 108B is disabled. The circuit 502 that includes the contactless antenna 108B, the capacitors 210B, 406H, and 406J is effectively no longer connected to the controller 102. In other words, the contactless antenna 108A is deactivated by having both terminals coupled to reference ground.

The inductor 404A in combination with the capacitor 406G and the inductor 404B in combination with the capacitor 406I provide an EMC filter for the contactless antenna 108A. The equivalent capacitor 506A is a capacitor having an equivalent capacitance to the capacitance of the capacitors 406C and 406D arranged in series. More precisely, the capacitors 406C and 406D form an equivalent capacitor 506A, $$C_{506A} = \frac{C_{406C} \times C_{406D}}{C_{406C} + C_{406D}}.$$

The equivalent capacitor 506B is a capacitor having an equivalent capacitance to the capacitance of the capacitors 406E and 406F arranged in series. More precisely, the capacitors 406E and 406F form an equivalent capacitor 506B, $$C_{506B} = \frac{C_{406E} \times C_{406F}}{C_{406E} + C_{406F}}.$$

The equivalent capacitors 506A-B and the capacitor 210A provide a matching circuit for the contactless antenna 108A.

Figure 5B:
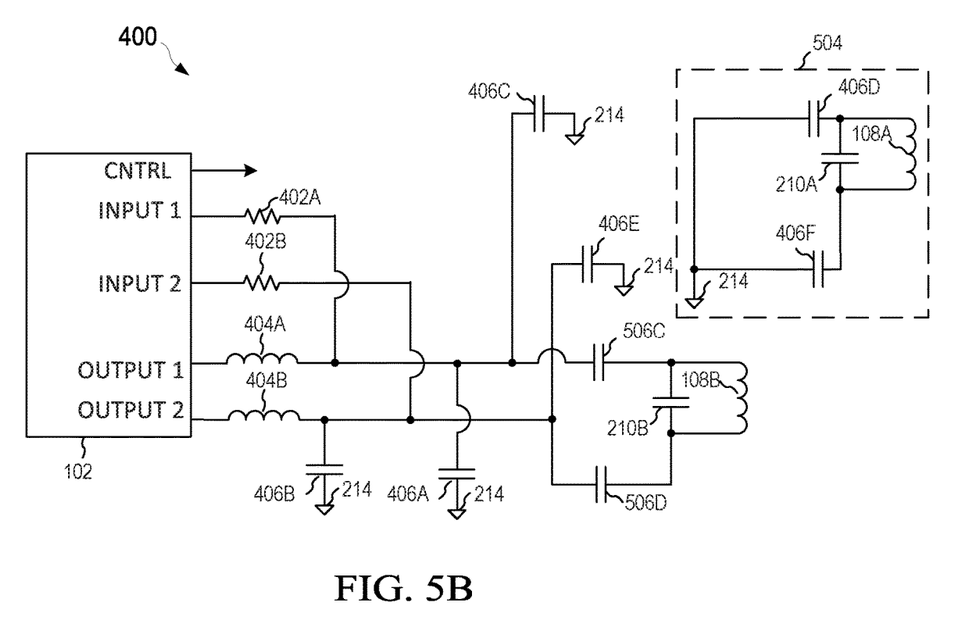
FIG. 5B illustrates a schematic of an equivalent circuit to the antenna circuit of FIG. 4 in a second configuration.

FIG. 5B illustrates an equivalent circuit to the antenna circuit 400 when switches 408C-D are switched OFF and switches 208A-B are switched ON and conducting. In a second configuration, or state, of the antenna circuit 400, the switches 408A-B are short-circuited to the reference voltage 214 and the contact terminals 416A-B are shorted to the reference voltage. The switches 408C-D are open and the contact terminals 416C-D are not shorted to the reference voltage. In this configuration, the contactless antenna 108B is operational and the contactless antenna 108A is disabled. The circuit 504 that includes the contactless antenna 108A, the capacitors 210A, 406D, and 406F is effectively no longer connected to the controller 102. In other words, the contactless antenna 108B is deactivated by having both terminals coupled to reference ground.

The inductor 404A in combination with the capacitor 406C and the inductor 404B in combination with the capacitor 406E provide an EMC filter for the contactless antenna 108B. The equivalent capacitor 506C is a capacitor having an equivalent capacitance to the capacitance of the capacitors 406G and 406H arranged in series. More precisely, the capacitors 406G and 406H form an equivalent capacitor 506C, $$C_{506C} = \frac{C_{406G} \times C_{406H}}{C_{406G} + C_{406H}}.$$

The equivalent capacitor 506D is a capacitor having an equivalent capacitance to the capacitance of the capacitors 406I and 406J arranged in series. More precisely, the capacitors 406I and 406J form an equivalent capacitor 506D, $$C_{506D} = \frac{C_{406I} \times C_{406J}}{C_{406I} + C_{406J}}.$$

The equivalent capacitors 506C-D and the capacitor 210B provide a matching circuit for the contactless antenna 108B.

The two different configurations, shown in FIGS. 5A-B, advantageously allow the operation of two different or same contactless antennas 108A and 108B, each having different or same impedances. The value of the capacitors 406G and 406I may be selected to provide an EMC filter for the contactless antenna 108A. The value of the capacitors 406D, 406F, and 210A may be selected to provide a matching circuit for the operation of the contactless antenna 108A. As an example, the values of the capacitors 406G, 406I, 406D, 406F, and 210A may be selected to provide a circuit operating at a resonance frequency equal to 6.78 MHz, which is compatible with contactless charging conforming to the alliance for wireless power (A4WP) specifications. In this example, the contactless antenna 108A may be configured to operate at around 6.78 MHz.

The value of the capacitors 406C and 406E may be selected to provide an EMC filter for the contactless antenna 108B. The value of the capacitors 406H, 406J, and 210B may be selected provide a matching circuit for the operation of the contactless antenna 108B. As an example, the values of the capacitors 406C, 406E, 406H, 406J, and 210A may be selected to provide a circuit operating at a resonance frequency equal to 13.56 MHz, which is compatible with contactless charging conforming to the near field communication (NFC) specifications. In this example, the contactless antenna 108B may be configured to operate at around 13.56 MHz.

Figure 6:
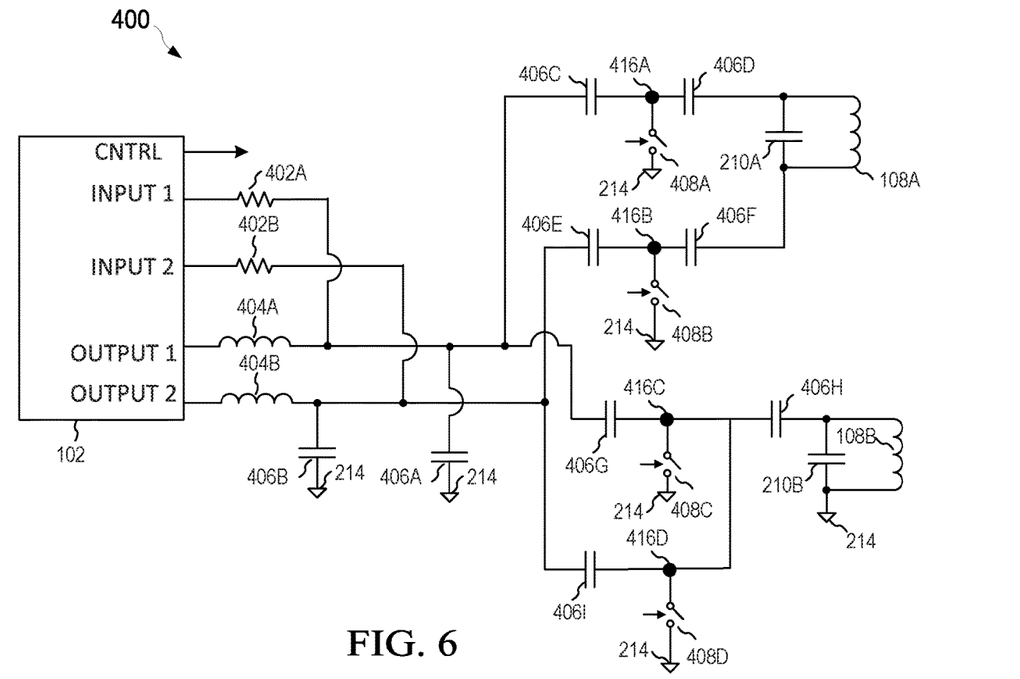
FIG. 6 illustrates a schematic of an embodiment antenna circuit operating using differential and single-ended signaling.

FIG. 6 illustrates a schematic of an embodiment antenna circuit 600 operating using differential and single-ended signaling. The antenna circuit 600, as shown, includes the controller 102, EMC filter circuits 104A-B, matching circuits 106A-B, and the contactless antennas 108A-B of FIG. 1. The antenna circuit 600 may be arranged as a single integrated circuit or discrete components within the contactless communication block 101 of FIG. 1.

The antenna circuit 600 is similar to the antenna circuit 400 of FIG. 4; however, the contactless antenna 108B in FIG. 6 operates using single-ended signaling. As such, the contactless antenna 108B in FIG. 6 is similar to the contactless antenna 108B in FIG. 2. The antenna circuit 600 may not include the capacitor 406J.

Figure 7A:
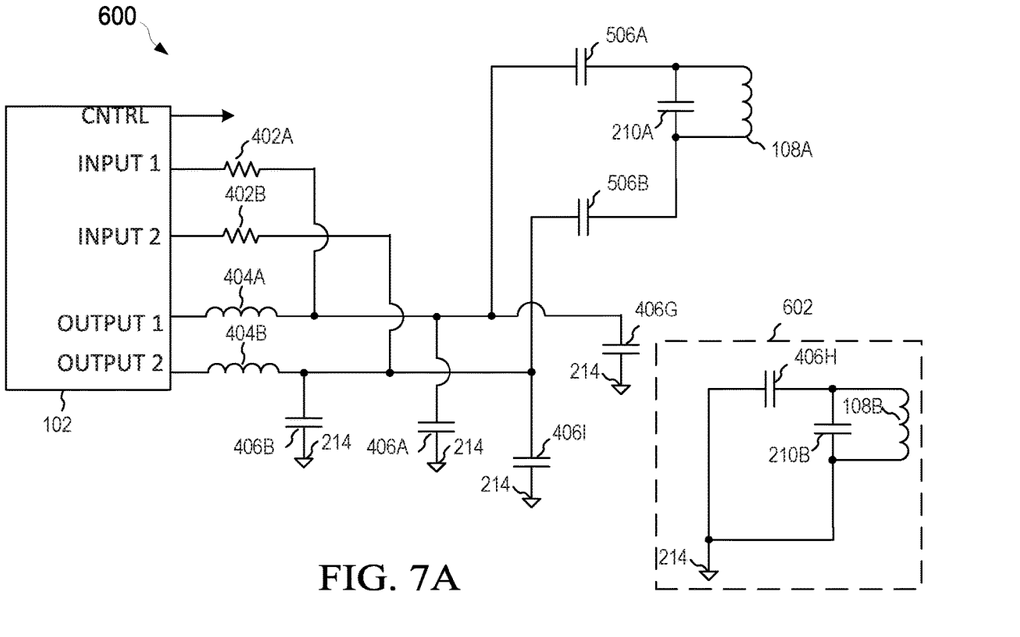
FIG. 7A illustrates a schematic of an equivalent circuit to the antenna circuit of FIG. 6 in a first configuration.

FIG. 7A illustrates an equivalent circuit to the antenna circuit 600 when switches 408A-B are switched OFF and switches 208C-D are switched ON and conducting. In a first configuration, or state, of the antenna circuit 600, the switches 408C-D are short-circuited to the reference voltage 214 and the contact terminals 416C-D are shorted to the reference voltage. The switches 408A-B remain open and the contact terminals 416A-B are not shorted to the reference voltage. In this configuration, the contactless antenna 108A is operational and the contactless antenna 108B is disabled. The circuit 602 that includes the contactless antenna 108B and the capacitors 210B and 406H is effectively no longer connected to the controller 102. In other words, the contactless antenna 108B is deactivated by having both terminals coupled to reference ground.

The inductor 404A in combination with the capacitor 406G and the inductor 404B in combination with the capacitor 406I provide an EMC filter for the contactless antenna 108A. The equivalent capacitor 506A is a capacitor having an equivalent capacitance to the capacitance of the capacitors 406C and 406D arranged in series. More precisely, the capacitors 406C and 406D form an equivalent capacitor 506A, $$C_{506A} = \frac{C_{406C} \times C_{406D}}{C_{406C} + C_{406D}}.$$

The equivalent capacitor 506B is a capacitor having an equivalent capacitance to the capacitance of the capacitors 406E and 406F arranged in series. More precisely, the capacitors 406E and 406F form an equivalent capacitor 506B, $$C_{506B} = \frac{C_{406E} \times C_{406F}}{C_{406E} + C_{406F}}.$$

The equivalent capacitors 506A-B and the capacitor 210A provide a matching circuit for the contactless antenna 108A.

Figure 7B:
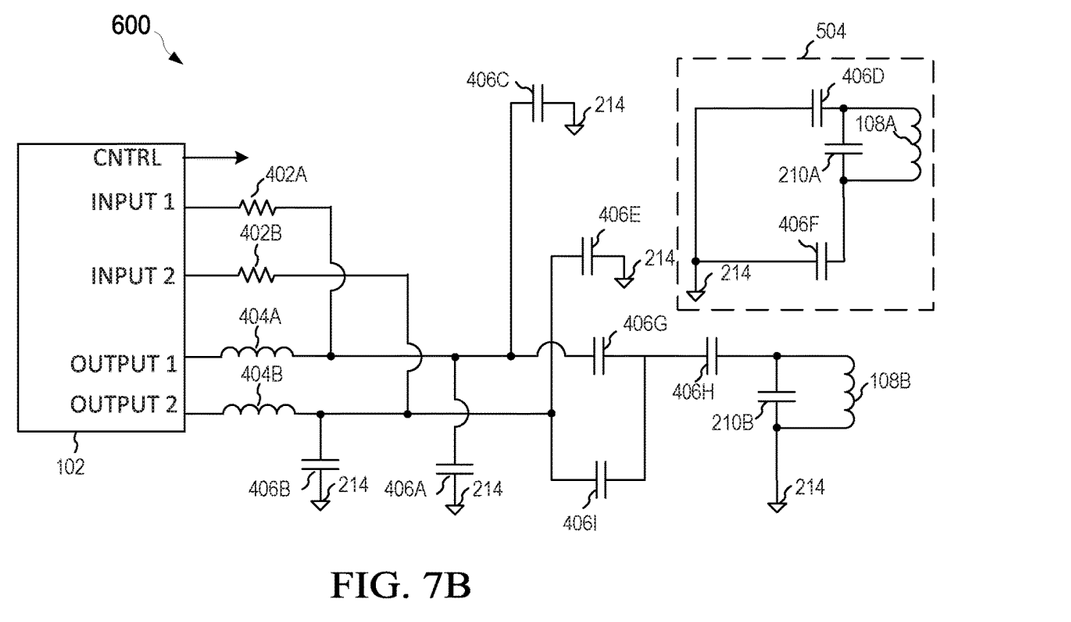
FIG. 7B illustrates a schematic of an equivalent circuit to the antenna circuit of FIG. 6 in a second configuration.

FIG. 7B illustrates an equivalent circuit to the antenna circuit 600 when switches 408C-D are switched OFF and switches 208A-B are switched ON and conducting. In a second configuration, or state, of the antenna circuit 600, the switches 408A-B are short-circuited to the reference voltage 214 and the contact terminals 416A-B are shorted to the reference voltage. The switches 408C-D are open and the contact terminals 416C-D are not shorted to the reference voltage. In this configuration, the contactless antenna 108B is operational and the contactless antenna 108A is disabled. The circuit 504 that includes the contactless antenna 108A, the capacitors 210A, 406D, and 406F is effectively no longer connected to the controller 102. In other words, the contactless antenna 108A is deactivated by having both terminals coupled to reference ground.

The inductor 404A in combination with the capacitor 406C and the inductor 404B in combination with the capacitor 406E provide an EMC filter for the contactless antenna 108B. The capacitors 406G, 406H, 406I, and 210B provide a matching circuit for the contactless antenna 108B operating using single-ended signaling.

The antenna circuit 600, as shown in FIGS. 6 and 7A-B, advantageously provides a circuit for EMC filtering, RF matching, and operation in a first and second configuration for the contactless antenna 108A operating using differential signaling and the contactless antenna 108B operating using single-ended signaling.

In each of the embodiments of FIGS. 2, 4, and 6, a switched capacitor to ground may be used to disconnect a portion of the circuit. Additionally, the switches may be configured such that one of the contactless antennas 108A or 108B are selected and made available when the main platform or host device is turned OFF. The control signal for the switches can be a general-purpose input/output (GPIO) that is simple to manage. The switches advantageously improve system and circuit reliability. Therefore, providing an advantageous antenna circuit solution using, for example, n-MOSFET technology, which has generally been implemented in a complementary metal-oxide-semiconductor (CMOS). The embodiments of this disclosure minimize parasitic elements, which may generate loss in a signal. The embodiments of this disclosure provide a means to reduce losses.

The embodiment antenna circuits 200, 400, and 600 advantageously minimize signal compression as a result of clamping of a signal that may be higher than an analog switch supply domain signal.

Figure 8:
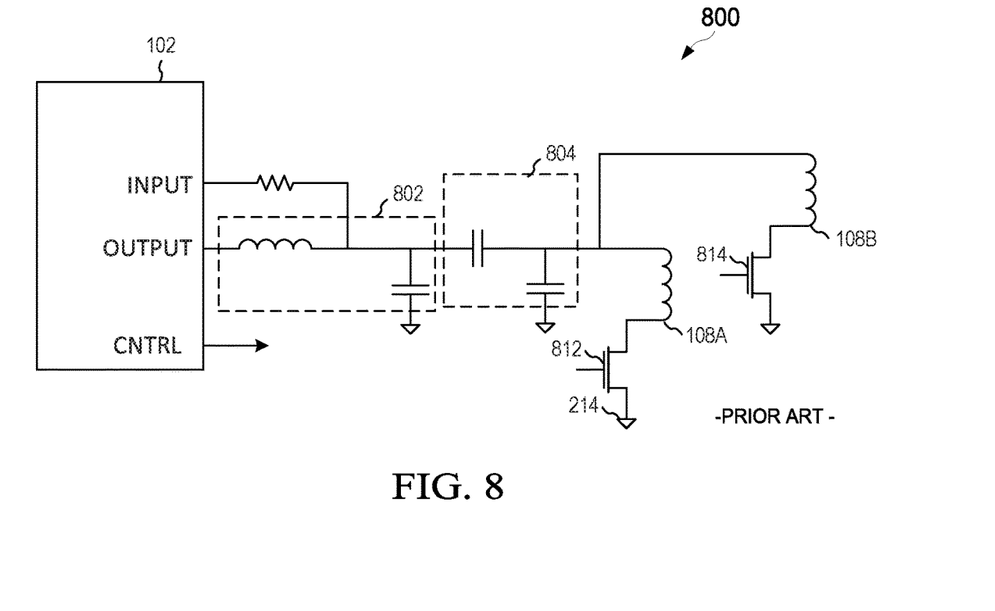
FIG. 8 illustrates a schematic of a prior art antenna circuit operating using single-ended signaling.

FIG. 8 illustrates a schematic of a prior art antenna circuit 800 operating using single-ended signalling. Similar to the antenna circuit 200 of FIG. 2, the signal traveling through the antenna circuit 800 is referenced to the reference voltage 214. The antenna circuit 800 includes the controller 102, EMC filter 802, matching circuit 804, and the contactless antennas 108A-B. In addition, antenna circuit 800 includes FETs 812 and 814. The FETs 812 and 814 are used to selectively switch each of the contactless antennas 108A or 108B between ON and OFF modes.

Disadvantageously, the EMC filter 802 and the matching circuit 804 are shared between the two contactless antennas 108A and 108B. Therefore, for proper operation, the contactless antennas 108A and 108B must have the same resonant frequency and impedance, and therefore be the same exact antenna.

In addition, at least one of the FETs 812 or 814 must receive a control signal to enable at least one of the contactless antennas. Therefore, if the host device is in OFF mode, either both antennas are ON or both antennas are OFF. If both antennas remain ON, this leads to signal compression.

These and other issues of the prior art circuits are addressed with the embodiments of this disclosure, for example using the antenna circuits 200 and 600.

Figure 9:
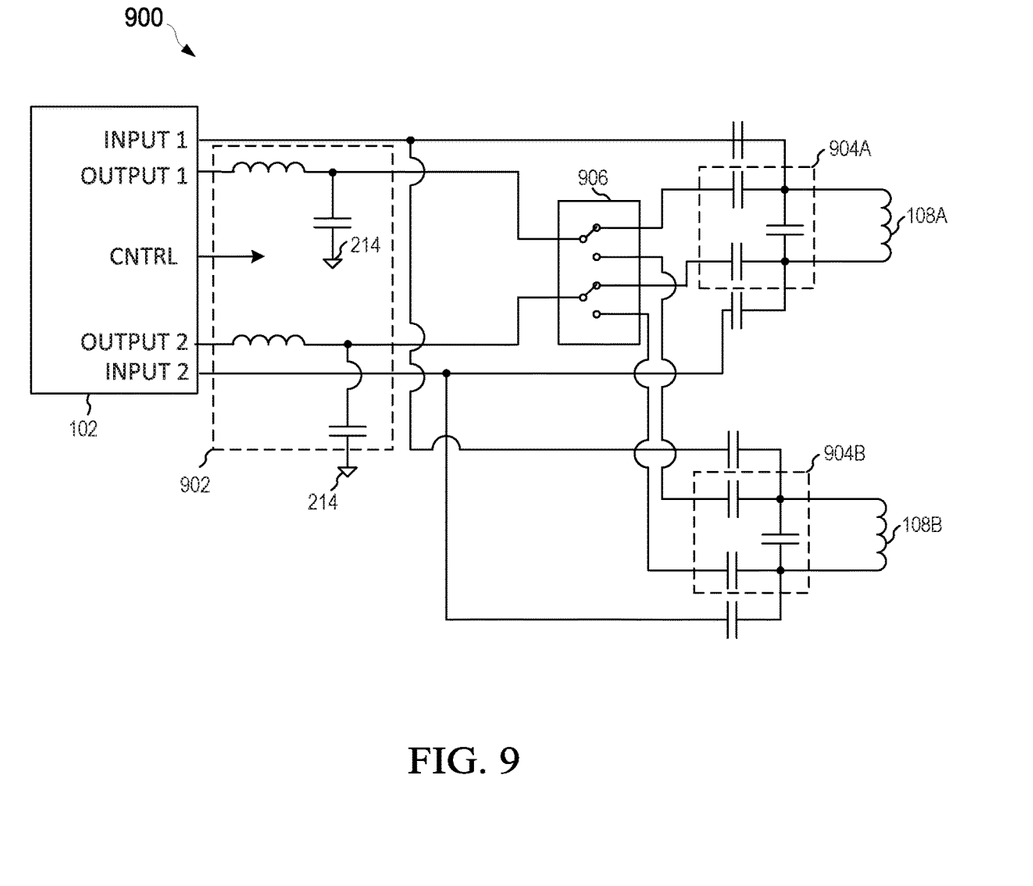
FIG. 9 illustrates a schematic of a prior art antenna circuit operating using differential signaling.

FIG. 9 illustrates a schematic of a prior art antenna circuit 900 operating using differential signaling. Similar to the antenna circuit 400 of FIG. 4, each node of the contactless antennas 108A and 108B in FIG. 9 receives a different one of the differential pair of signals. The antenna circuit 900 includes the controller 102, EMC filter 902, multiplexer 906 (i.e., controlled switch), and matching circuits 904A and 904B.

Similar to the antenna circuit 800, the EMC filter 902 is shared between the two contactless antennas 108A and 108B. Therefore, for proper operation, the contactless antennas 108A and 108B must have the same impedance. In addition, the multiplexer 906 must receive a control signal to enable at least one of the contactless antennas. Therefore, if the host device is in OFF mode, either both antennas are ON or both antennas are OFF. If both antennas remain ON, this leads to signal compression.

These and other issues of the prior art circuits are addressed with the embodiments of this disclosure, for example using the antenna circuits 400 and 600.

While the inventive aspects are described primarily in the context of near-field communication (NFC), it should also be appreciated that these inventive aspects may also be applicable to other standard or proprietary protocols operating over the frequency spectrum. Therefore, the discussion of example embodiments to NFC related technology should not be construed as being limiting to either the scope or spirit of the example embodiments.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. An antenna circuit comprising:
  a first switch configured as normally switched ON, the first switch configured to be switched OFF after receiving a first gate bias;
  a second switch configured as normally switched OFF, the second switch configured to be switched ON after receiving a second gate bias, the second switch switched ON in response to the first switch being switched OFF;
  a first contactless antenna electrically coupled to a first terminal of the first switch, the first contactless antenna disabled in response to the first switch being switched ON, the first contactless antenna enabled in response to the first switch being switched OFF;
  a second contactless antenna electrically coupled to a first terminal of the second switch, the second contactless antenna disabled in response to the second switch being switched ON, the second contactless antenna enabled in response to the second switch being switched OFF; and
  a controller electrically coupled to the first terminal of the first switch and a first terminal of the second switch, the controller configured to control an operation of the first switch and the second switch by generating the first gate bias and the second gate bias.

2. The antenna circuit of claim 1, wherein the first switch is a depletion-mode metal-oxide-semiconductor field effect transistor (MOSFET) and the second switch is an enhancement-mode MOSFET.

3. The antenna circuit of claim 1, wherein the first contactless antenna or the second contactless antenna operates using single-ended signaling, differential signaling, or a combination thereof.

4. The antenna circuit of claim 1, wherein the controller is a near field communication (NFC) controller capable of operating in card-emulation mode, reader/writer mode, peer-to-peer mode, or a combination thereof.

5. The antenna circuit of claim 1, wherein a resonant frequency of the first contactless antenna or the second contactless antenna is 13.56 megahertz (MHz), 27.12 MHz, 6.78 MHz, or a combination thereof.

6. The antenna circuit of claim 1, further comprising:
an electromagnetic compatibility (EMC) filter coupled between the controller and the first contactless antenna, the EMC filter configured to filter out signals outside of a resonant frequency of the first contactless antenna; and
a matching circuit coupled between the controller and the first contactless antenna, the matching circuit configured to match an impedance of the first contactless antenna to an impedance of the controller and the EMC filter.

7. The antenna circuit of claim 1, further comprising:
an electromagnetic compatibility (EMC) filter coupled between the controller and the second contactless antenna, the EMC filter configured to filter out signals outside of a resonant frequency of the second contactless antenna; and
a matching circuit coupled between the controller and the second contactless antenna configured to match an impedance of the second contactless antenna to an impedance of the controller and the EMC filter.

8. The antenna circuit of claim 1, wherein a resonant frequency of the first contactless antenna and a resonant frequency of the second contactless antenna is at a different frequency.

9. An electronic device comprising:
a controller configured to transmit and receive signals from a first contactless antenna and a second contactless antenna, the controller further configured to generate a first control signal and a second control signal;
the first contactless antenna coupled to the controller using a first matching circuit and a first filter, the first contactless antenna normally disabled and coupled to a reference voltage, the first contactless antenna enabled in response to the controller generating the first control signal; and
the second contactless antenna coupled to the controller using a second matching circuit and a second filter, the second contactless antenna normally enabled, the second contactless antenna disabled in response to the controller generating the second control signal, the second contactless antenna enabled in response to the first contactless antenna being disabled, the second contactless antenna disabled in response to the first contactless antenna being enabled, the first contactless antenna and the second contactless antenna having a different resonant frequency, the first contactless antenna and the second contactless antenna connected to a same input port and output port of the controller, at least one capacitor of the first matching circuit is used in the second filter, at least one capacitor of the second matching circuit is used in the first filter.

10. The electronic device of claim 9, wherein the first contactless antenna or the second contactless antenna operates using single-ended signaling, differential signaling, or a combination thereof.

11. The electronic device of claim 9, wherein the controller is a near field communication (NFC) controller capable of operating in card-emulation mode, reader/writer mode, peer-to-peer mode, or a combination thereof.

12. The electronic device of claim 9, wherein a resonant frequency of the first contactless antenna or the second contactless antenna is 13.56 megahertz (MHz), 27.12 MHz, or 6.78 MHz.

13. The electronic device of claim 9, further comprising:
an electromagnetic compatibility (EMC) filter coupled between the controller and the first contactless antenna, the EMC filter configured to filter out signals outside of a resonant frequency of the first contactless antenna; and
a matching circuit coupled between the controller and the first contactless antenna, the matching circuit configured to match an impedance of the first contactless antenna to an impedance of the controller and the EMC filter.

14. The electronic device of claim 9, further comprising:
an electromagnetic compatibility (EMC) filter coupled between the controller and the second contactless antenna, the EMC filter configured to filter out signals outside of a resonant frequency of the second contactless antenna; and
a matching circuit coupled between the controller and the second contactless antenna, the matching circuit configured to match an impedance of the second contactless antenna to an impedance of the controller and the EMC filter.

15. An antenna circuit comprising:
a first contactless antenna and a second contactless antenna;
a first matching circuit comprising a first switch, a first capacitor, a second capacitor, and a third capacitor, a first terminal of the first capacitor coupled to a first terminal of the first contactless antenna and to a first terminal of the second capacitor, a second terminal of the first capacitor coupled to a second terminal of the first contactless antenna, a second terminal of the second capacitor coupled to a first terminal of the third capacitor and to an input terminal of the first switch, and an output terminal of the first switch coupled to a reference ground (Vref);
a second matching circuit comprising a second switch, a fourth capacitor, a fifth capacitor, and a sixth capacitor, a first terminal of the fourth capacitor coupled to a first terminal of the second contactless antenna and to a first terminal of the fifth capacitor, a second terminal of the fourth capacitor coupled to a second terminal of the second contactless antenna, a second terminal of the fifth capacitor coupled to a first terminal of the sixth capacitor and to an input terminal of the second switch, and an output terminal of the second switch coupled to the reference ground; and
a controller comprising an input terminal, an output terminal, and one or more control terminals, each of the input terminal and the output terminal of the controller coupled to a second terminal of the third capacitor and to a second terminal of the sixth capacitor, the one or more control terminals of the controller coupled to a control terminal of the first switch and the second switch.

16. The antenna circuit of claim 15, wherein a second terminal of the first contactless antenna and a second terminal of the second contactless antenna are coupled to the reference ground.

17. The antenna circuit of claim 15, wherein the controller further comprises a second input terminal and a second output terminal, wherein the first matching circuit further comprises a third switch, a seventh capacitor, an eight capacitor, a first terminal of the seventh capacitor coupled to the second terminal of the first contactless antenna, a second terminal of the seventh capacitor coupled to a first input of the third switch and to a first terminal of the eight capacitor, a second terminal of the eight capacitor coupled to the second input terminal and to the second output terminal of the controller, an output of the third switch coupled to the reference ground, and the one or more control terminals of the controller coupled to a control terminal of the third switch.

18. The antenna circuit of claim 17, wherein the second matching circuit further comprises a fourth switch, a ninth capacitor, and a tenth capacitor, a first terminal of the ninth capacitor coupled to the second terminal of the second contactless antenna, a second terminal of the ninth capacitor coupled to a first input of the fourth switch and to a first terminal of the tenth capacitor, a second terminal of the tenth capacitor coupled to the second input terminal and to the second output terminal of the controller, and an output of the fourth switch coupled to the reference ground, and the one or more control terminals of the controller coupled to a control terminal of the fourth switch.

19. The antenna circuit of claim 15, wherein the first contactless antenna operates at a different resonant frequency than the second contactless antenna.

20. A method, comprising:
having a shared controller coupled to a first contactless antenna and a second contactless antenna in an antenna circuit, the shared controller configured to transmit and receive signals from a first contactless antenna and a second contactless antenna;
coupling the first contactless antenna to the shared controller and decoupling the second contactless antenna from the shared controller in a first configuration state of the antenna circuit, the first contactless antenna coupled to the shared controller using a first matching circuit and a first filter; and
operating a controllable activation component to define a second configuration state of the antenna circuit formed by decoupling the first contactless antenna from the shared controller, coupling the second contactless antenna to the shared controller, the second contactless antenna coupled to the shared controller using a second matching circuit and a second filter, at least one capacitor of the first matching circuit is used in the second filter, at least one capacitor of the second matching circuit is used in the first filter.

21. The method of claim 20, wherein the first contactless antenna and the second contactless antenna operate at a different resonant frequency.

22. The method of claim 20, wherein at least one of the first contactless antenna or the second contactless antenna is coupled to the shared controller.

23. The method of claim 20, wherein each of the first contactless antenna and second contactless antenna is configured for single-ended signaling or differential signaling.

* * * * *